(12) United States Patent
Pallamreddy et al.

(10) Patent No.: US 8,849,946 B2
(45) Date of Patent: Sep. 30, 2014

(54) SYSTEM AND METHOD FOR HYPERTEXT TRANSFER PROTOCOL PUBLISH AND SUBSCRIBE SERVER

(75) Inventors: Prasanth Pallamreddy, Fremont, CA (US); Steven Liu, Beijing (CN); Xiao Hai Zhang, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 1239 days.

(21) Appl. No.: 12/329,396

(22) Filed: Dec. 5, 2008

(65) Prior Publication Data

US 2009/0150502 A1    Jun. 11, 2009

Related U.S. Application Data

(60) Provisional application No. 60/992,544, filed on Dec. 5, 2007.

(51) Int. Cl.
*G06F 15/16* (2006.01)
*H04L 29/08* (2006.01)

(52) U.S. Cl.
CPC .................. *H04L 67/26* (2013.01); *H04L 67/02* (2013.01)
USPC ............ 709/217; 709/203; 709/218; 709/219

(58) Field of Classification Search
USPC ......................... 709/203, 217–219
See application file for complete search history.

(56) References Cited

U.S. PATENT DOCUMENTS

| | | | |
|---|---|---|---|
| 7,216,181 B1 * | 5/2007 | Jannu et al. | 709/246 |
| 7,293,038 B2 * | 11/2007 | Blevins et al. | 1/1 |
| 7,489,704 B2 * | 2/2009 | Maffeis et al. | 370/466 |
| 7,802,264 B2 * | 9/2010 | Robertson et al. | 709/215 |
| 8,161,168 B2 * | 4/2012 | Lankford et al. | 709/227 |
| 8,200,775 B2 * | 6/2012 | Moore | 709/217 |
| 2003/0115291 A1 * | 6/2003 | Kendall et al. | 709/219 |
| 2013/0166681 A1 * | 6/2013 | Thompson et al. | 709/217 |

OTHER PUBLICATIONS

David A Chappell, Richard Monson-Haefel; Java Message Service, Dec. 4, 2000, O'Reilly Media, Inc., pp. 1-16.*
Sasu Tarkoma, Kimmo Raatikainen, State of the Art Review of Distributed Event Systems, Feb. 19, 2006, MINEMA, pp. 1-59.*
Alex Russel, David Davis, Greg Wilkins, Mark Nesbitt, Bayeux Protocol—Bayeux 1.0draft1, Oct. 11, 2007, Dojo Foundation, pp. 1-23.*
David A. Chapell, Richard Monson-Haefel; Java Message Service, Dec. 4, 2000, O'Relly Media, Inc., pp. 58-77 and pp. 131-141.*
IBM's Ajax for WebSphere Platform Early Program Includes Dojo and Comet Features, http://0.dojotoolkit.org/2007/01/15/ibm-ajax-websphere-platform-early, Jan. 15, 2007, 2 pages.
Ajaxian, Ajax for IBM WebSphere Platform Early Program, http://ajaxian.com/archives/ajax-for-ibm-websphere-platform-early-program, Jan. 22, 2007, 1 page.

(Continued)

*Primary Examiner* — Hieu Hoang
*Assistant Examiner* — Angela Widhalm
(74) *Attorney, Agent, or Firm* — Meyer IP Law Group (57) ABSTRACT

A system and method for providing a publish and subscribe server that includes channels to allow web based clients to send and receive asynchronous messages. In accordance with an embodiment, the system provides a Hypertext Transfer Protocol (HTTP) publish and subscribe (pub/sub) server that includes a channels-based means to allow web based clients to send and receive asynchronous messages over HTTP, including in some embodiments messages published by a JMS provider.

20 Claims, 4 Drawing Sheets

(56) References Cited

OTHER PUBLICATIONS

Ajax for IBM WebSphere Platform Open Program Released, Ajax for IBM WebSphere Platform, http://forums.asp.net/t/1072762.aspx, Feb. 8, 2007, 1 page.

Ajax for IBM WebSphere, diTii.com D'Technology Weblog, http://www.ditii.com/2007/02/08/ajax-for-ibm-websphere-platform, Dec. 9, 2010, 8 pages.

Unbeateable JavaScript Tools, http://dojotoolkit.org/, Dec. 9, 2010, 1 page.

Rename of dojox.io.cometd to dojox.cometd, http://fisheye.codehaus.org/changelog/jetty-contrib?cs=205, May 30, 2007, 1 page.

gCometd: Introducing the Cometd Framework and its Bayeux Protocol Support in Grizzly, http://weblogs.java.net/blog/jfarcand/archive/2007/02/gcometd_introdu_1.html, Feb. 2, 2007, 1 page.

Aparche ActiveMQ, http://activemq.apache.org/ajax.html, Dec. 9, 2010, 4 pages.

JSR 315: Java Servlet 3.0 Specification, http://www.jcp.org/en/jsr/detail?id=315, Dec. 9, 2010, 10 pages.

TIBCO, http://www.tibco.com/products/soa/composite-applications/ajax-message, Dec. 9, 2010, 1 page.

Lightstreamer: Live Web Content Delivery, http://lightstreamer.com, Dec. 9, 2010, 1 page.

Feature Pack for Web 2.0, http://publib.boulder.ibm.com/infocenter/wsdoc400/v6r0/topic/com.ibm.websphere.web2, Nov. 21, 2008, 1 page.

Developing Web Messaging Enabled Applications, http://publib.boulder.ibm.com/infocenter/wsdoc400/v6r0/topic/com.ibm.websphere.web, Nov. 21, 2008, 2 pages.

Websphere Software, Service Integration, http://publib.boulder.ibm.com/infocenter/wsdoc400/v6r0/topic/com.ibm/websphere.web, Nov. 21, 2008, 1 page.

Integrating with ActiveMQ, http;//docs.codehas.org/display/Jetty/Integrating+with+ActiveMW, Jul. 13, 2006, 5 pages.

Cometed with Jetty, http://blogs.webtide.com/gregw/entry/cometd_wtih_jetty, Aug. 3, 2006, 3 pages.

Ajax for IBM Websphere Platform, http://www.ditii.com/2007/02/08/ajax-for-ibm-websphere-platform, Feb. 2, 2007, 5 pages.

The Bayeux Specification, Bayeux Protocol—Bayeux 10.0, http://svn.xantus.org/shortbus/trunk/bayeux/bayeux.html, Dec. 9, 2010, 25 pages.

Welcome to CometD Project @ The Dojo Foundation, http://www.cometd.org, Dec. 9, 2010, 2 pages.

Introducing JSON, http://www.json.org/, Dec. 9, 2010, 6 pages.

Ajax Streaming Connection Demo, http://ajaxify.com/run/streaming/, Dec. 9, 2010, 1 page.

Informix Application Developement, http://www.ibm.com/developerworks/mydeveloperworks/blogs/gboweb, Jan. 18, 2007, 4 pages.

Programming Tools: Ajax for IBM WebSphere? Platform Open Early Program Released, http://programming.itags.org/programming-tools/1026, Nov. 14, 2007, 7 pages.

* cited by examiner

SYSTEM AND METHOD FOR HYPERTEXT TRANSFER PROTOCOL PUBLISH AND SUBSCRIBE SERVER

CLAIM OF PRIORITY

This application claims the benefit of priority to U.S. Provisional patent application titled "SYSTEM AND METHOD FOR HYPERTEXT TRANSFER PROTOCOL PUBLISH AND SUBSCRIBE SERVER", Application No. 60/992,544, filed Dec. 5, 2007, and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is generally related to application servers, and particularly to a system and method for providing a publish and subscribe server that includes channels to allow clients to send and receive asynchronous messages.

This application includes a compact disc computer program listing appendix, which is provided on one compact disc, and a duplicate compact disc, both of which compact discs contain the files Appendix_A.txt, created Jul. 21, 2014 and 24,024 bytes in size; Appendix_B.txt, created Jul. 21, 2014 and 1,718 bytes in size; and Appendix_C.txt, created Jul. 21, 2014 and 2,242 bytes in size, as further described herein, which compact disc computer program listing appendix is herein incorporated by reference.

BACKGROUND

There has been an increased demand to allow client-based software applications to access different channels of information at servers. Since such client-based applications generally run on a client computer within a browser application (for example, Internet Explorer), and communicate with the server using the Hypertext Transfer Protocol (HTTP), techniques that support channel-based communication over protocols such as HTTP are of particular interest. One example of such a channel-based technology is the Bayeux protocol, described in further detail in "Bayeux Protocol—Bayeux 1.0 draft 1", published by the Dojo Foundation, and incorporated herein by reference. Bayeux describes a protocol for transporting asynchronous messages with low latency, primarily over HTTP. Messages are routed via named channels, and can be delivered from: (a) server to client, (b) client to server, or (c) client to client. The Bayeux protocol can be used to provide responsive user interactions for web clients, including for example, Ajax or similar clients, and "server push" techniques. However, the Bayeux technology does not address anything other than the client-server protocol specification, and in particular does not provide for any changes to the server technology to make better and use of channel-based client-server communications. This is the area that embodiments of the present invention are generally designed to address.

SUMMARY

Described herein is a publish and subscribe (pub/sub) server, including a channel-based publish/subscribe means for allowing web based clients to send and receive asynchronous messages over HTTP. In accordance with an embodiment, the pub/sub server is responsible for identifying clients, negotiating trust, and exchanging messages. The pub/sub server can be used by web clients to subscribe to channels (otherwise referred to as destinations), and to publish messages to the channels.

DETAILED DESCRIPTION

Described herein is a publish and subscribe (pub/sub) server, including a channel-based publish/subscribe means for allowing web based clients to send and receive asynchronous messages over protocols such as the Hypertext Transfer Protocol (HTTP). As described above, there is increased demand in the software industry to enable client-based applications to access channels of information at servers. Since such client-based applications generally run within a browser, and communicate with the server using the HTTP, there has been an emphasis on supporting channel-based communication using this protocol. One example of such a channel-based technology is the Bayeux protocol.

However, few technologies provide for the use of channels with applications servers such as those that support the Java Message Service (JMS). JMS is a messaging standard that allows application components based on the Java 2 Platform, Enterprise Edition (J2EE) to create, send, receive, and read messages. Typically, JMS is implemented as a collection of Java-based servers and API's that support message-based communications between two or more entities. Generally speaking, a JMS server can allow hundreds of participants to share information using one of two paradigms: (a) point-to-point or queue-based messaging; or (b) publish and subscribe.

In point-to-point messaging, a JMS producer posts messages to a centralized queue, and a JMS consumer then reads messages from the queue. If the producer knows the destination of the message they can post the message directly to the consumer's queue. Using the point-to-point paradigm, only one consumer will receive each message.

In publish/subscribe messaging, the JMS producer publishes messages to a particular message topic. JMS subscribers may then subscribe, or register their interest in receiving messages for a particular message topic. Using the publish/subscribe paradigm, many consumers can receive each message.

Software applications that are installed on client computers may or may not be JMS-based. In current popular usage, the most frequently used applications are Web-based, and run within a browser application, for example Internet Explorer or Mozilla, on the client. The client communicates with the server using the Hypertext Transfer Protocol, and by sending and receiving HTTP Responses.

However, in an enterprise system, and indeed in many other systems, the information is often stored in application servers that utilize JMS. One of the problems with communicating directly between these two technologies is that JMS servers are typically designed to handle several hundred message queues, JMS producers, and JMS consumers, at a time. In contrast, a web-based application must often support tens of thousands to millions of simultaneous users. There is no easy way to join these two systems, so that thousands of http-based clients can simultaneously draw upon the information from a single JMS provider. Embodiments of the present invention are designed to bridge this gap between JMS-based backend servers, and channel-based HTTP servers.

In accordance with an embodiment, the system comprises a HTTP pub/sub server that includes a channels-based publish/subscribe means for Web-based clients to send and receive asynchronous messages over HTTP. In accordance with an embodiment the pub/sub server can use the features of a protocol, such as the Bayeux protocol or another channel-based protocol. In accordance with an embodiment the pub/sub server is responsible for identifying clients, negotiating trust and exchanging messages, and can be used by web clients to subscribe to channels (a representation in Bayeux for destinations) and publish messages to the channels. The protocol can then be used to define a contract between the client and the server for communicating with asynchronous messages over HTTP. In accordance with an embodiment, the protocol allows clients to register a channel, or to subscribe to a channel. This associates the client with a named destination and/or source of events, and/or allows the client to publish messages to channel. As events are published to channels each subscriber to those channels can receive the published events.

Figure 1:
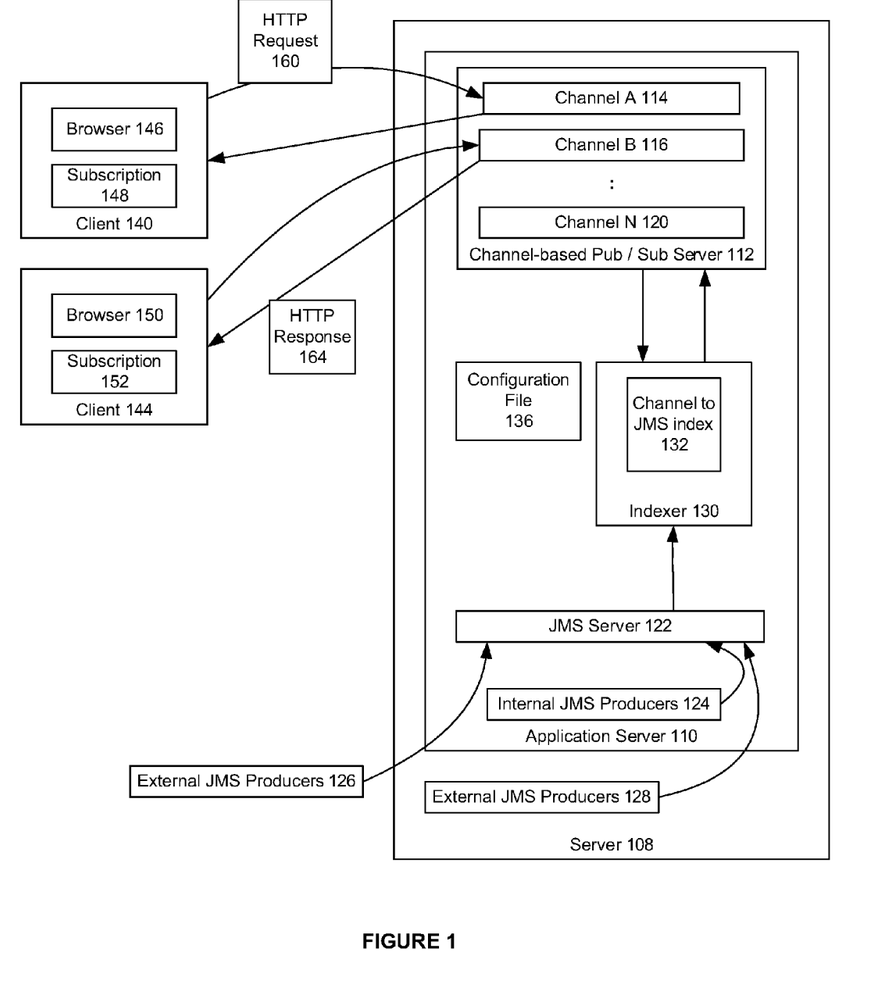
FIG. 1 shows an illustration of a system in accordance with an embodiment of the invention, comprising a pub/sub server.

FIG. 1 shows an illustration of a system in accordance with an embodiment. As shown in FIG. 1, the system comprises a server 108, such as a server computer or cluster of computers. When used with a cluster, the system can also take advantage of clustering features, such as replication and failover, so that if one pub/sub server instance stops working, any subscription information can be used by other pub/sub server instances to maintain client subscriptions. As further shown in FIG. 1, the system comprises an application server, for example one or more WebLogic Server instances. A pub/sub server 112 provides a plurality of channels 114, 116, 120 that client applications can subscribe to. A configuration file 136 is used to configure the channels and to associate channels with message producers. In accordance with an embodiment, subscription information is used by an indexer 130 to maintain a channel to JMS index 132. As messages or events are generated by message producers (for example, internal JMS producers 122, external JMS producers 126, 128, or other client-based or server-based sources), a server process, such as the JMS server 122 communicates those messages to the pub/sub server. The messages are then provided to subscribed clients on the appropriate channels. In accordance with an embodiment, clients or client applications 140, 144, which can include browser applications 146, 150, can request subscriptions 148, 152 to select channels at the server, and use HTTP to request 160, and receive 164 notifications from the pub/sub server as messages or events are generated.

In accordance with an embodiment, the system can use an Indexing Topic Subscriber Message Selectors to provide an indexing feature. The JMS server can optimize topic subscriber message selectors by indexing them. In these embodiments, the applications typically have a large number of subscribers, each with a unique identifier (such as a client name, user name, or client identifier). To activate subscriber message selectors, the subscribers can use the syntax for their selectors:

"identifier IS NOT NULL"

wherein identifier is a channel pattern that is not a predefined JMS message property. Multiple subscribers can share the same identifier. The JMS server then uses this exact message selector syntax as a hint to build internal subscriber indexes. Once subscribers have registered using this message selector syntax, a message published to a topic (for example a message published to a JMS topic by a JMS server) can target specific subscribers by including one or more of the identifiers in the message's user properties.

Figure 2:
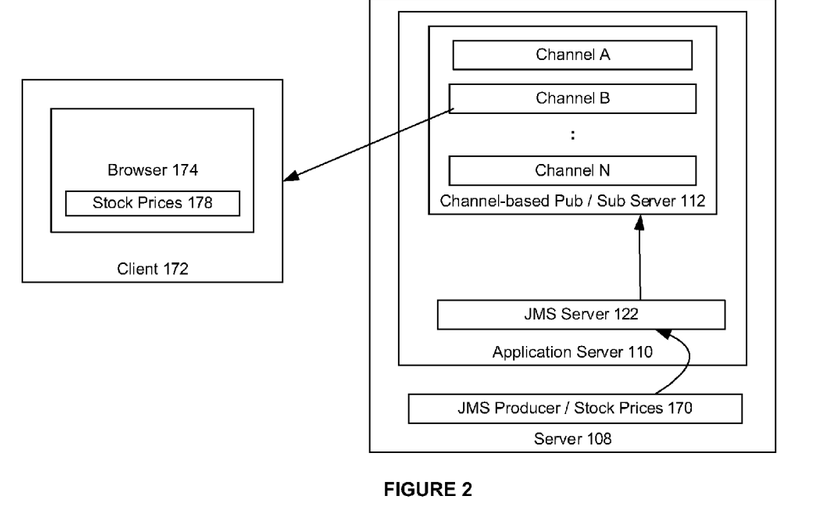
FIG. 2 shows an illustration of a system in accordance with an embodiment of the invention, comprising a JMS-based stock ticker.

FIG. 2 shows an illustration of a system in accordance with an embodiment of the invention, comprising a JMS-based stock ticker. As shown in FIG. 2, the system allows a JMS producer of stock prices 170 to publish updates of changing stock prices (i.e. a ticker) to different channels. Clients 172 using a browser application 174 can request subscriptions 178 to one or more stock prices using these channels. As the new prices are posted to the JMS server 122, the system provides the stock price on the appropriate channel to subscribed clients.

Figure 3:
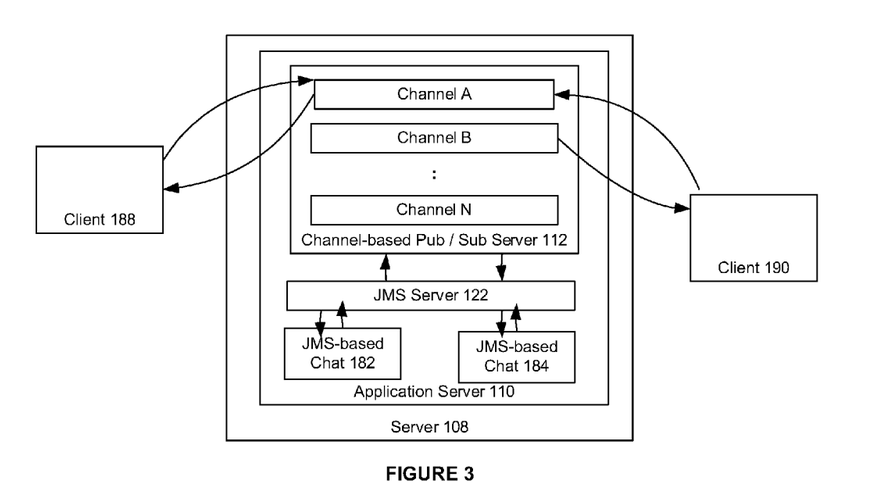
FIG. 3 shows an illustration of a system in accordance with an embodiment of the invention, comprising a JMS chat-based system with a plurality of clients.

FIG. 3 shows an illustration of a system in accordance with an embodiment of the invention, comprising a JMS chat-based system with a plurality of clients. As shown in FIG. 3, the system allows a plurality of JMS producers to maintain message-based chat sessions 182, 184 over different channels. Chat sessions can be initiated from and maintained by the server, or in accordance with some embodiments by the clients themselves. Clients 188, 190 can request subscriptions to one or more chat sessions. As new messages are posted to the chat sessions, the system provides the messages on the appropriate channel to subscribed clients.

Figure 4:
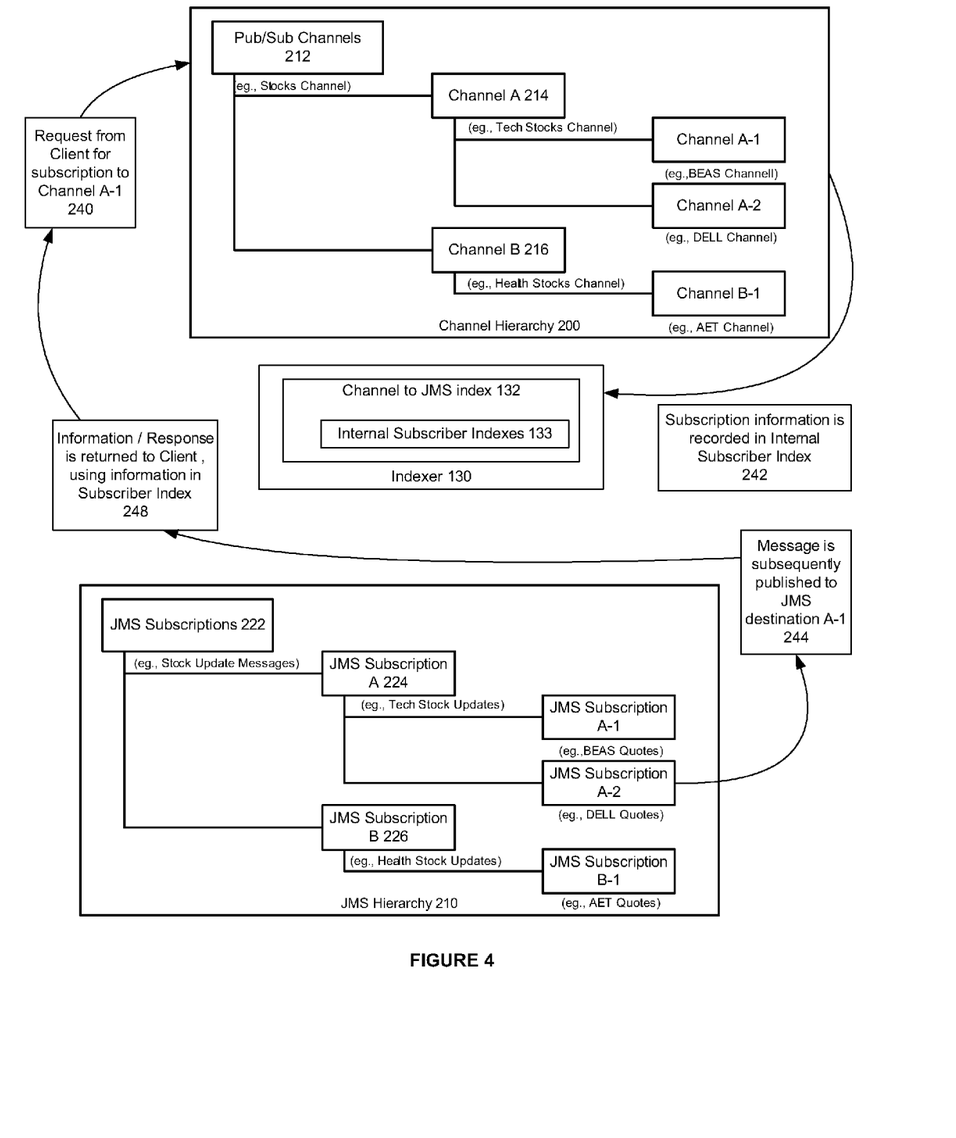
FIG. 4 shows an illustration of a means of associating HTTP channels with JMS destinations, in accordance with an embodiment of the invention.

FIG. 4 shows an illustration of a means of associating HTTP channels with JMS destinations, in accordance with an embodiment of the invention. As shown in FIG. 4, the system can be used to associate a channel-based hierarchy 200, for example one provided by the Bayeux protocol or another protocol, with a message-based hierarchy 210 such as one provided by a messaging server, or a JMS server. As further shown in FIG. 4, by way of example, pub/sub channels 212, 214, 216 are indexed to corresponding message producers, queues, subscriptions, or source destinations 222, 224, 226. In this example, channels for receiving updates of stock prices are associated with corresponding JMS sources for those stock prices. A client or client application can issue a request for subscription to one or more channels 240. This subscription information is then stored or recorded in an internal subscriber index 242. Messages or events are subsequently published by message producers, for example JMS producers 244. The pub/sub server uses the subscription information to provide the message, information, or other response to the client or client application 248.

Figure 5:
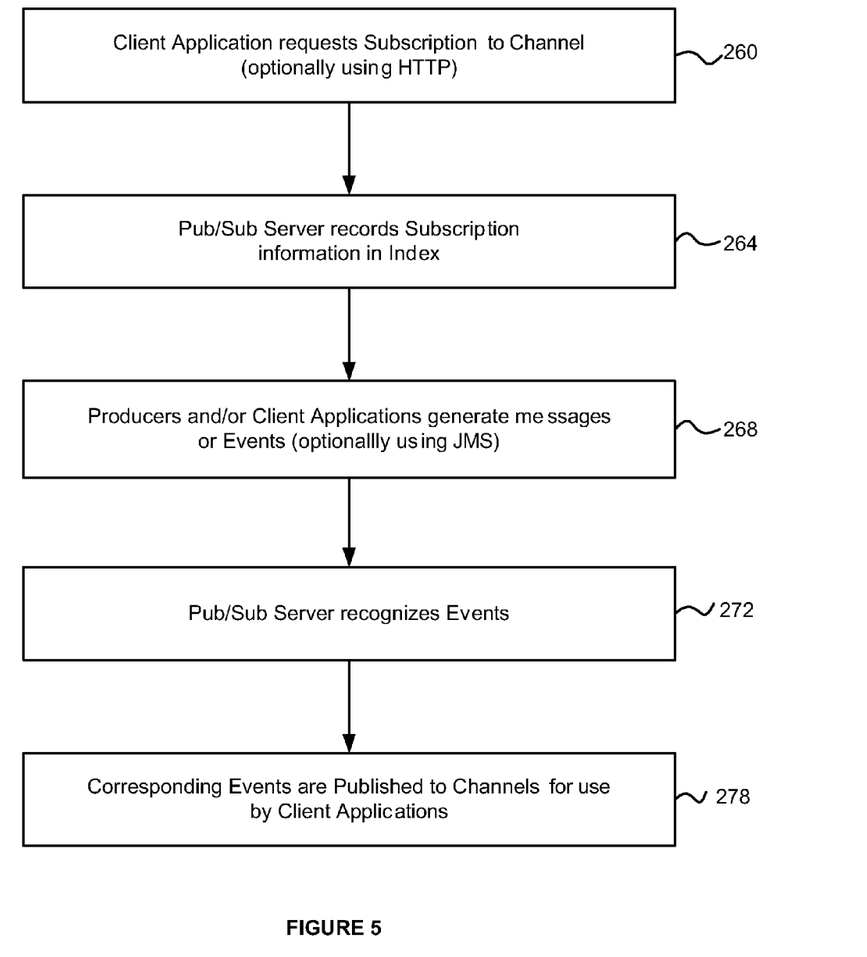
FIG. 5 shows a flowchart of a method in accordance with an embodiment of the invention.

FIG. 5 shows a flowchart of a method in accordance with an embodiment of the invention. As shown in FIG. 5, in step 260, a client application requests a subscription to one or more channels (optionally using a protocol such as HTTP, the Bayeux protocol, or another channel-based protocol). In step 264, the pub/sub server records subscription information in an index. In step 268, message or event producers and/or client applications generate messages or events (optionally using JMS). In step 272, the pub/sub server recognizes these events as they are generated. In step 278, corresponding events are then published to the channels for use by any subscribed client applications.

Example Implementation Details

In accordance with an embodiment, a protocol, such as the Bayeux protocol or another channel-based protocol, can be implemented in the application server as an API. The pub/sub server functionality can then be decoupled from the server instance itself, so that the pub/sub server functionality can be deployed out-of-band without having to update the server itself. In accordance with an embodiment, there is one pub/sub server available per web application. The channel namespace is also per web application. This allows channels with same names to be configured in two different apps. A 'context' object can be provided per web application so that application code can get a handle to the pub/sub server and perform operations on it. An application specific pub/sub server can then be looked-up as:

```
PubSubServerFactory factory = (PubSubServerFactory)
    FactoryFinder.getFactory(FactoryFinder.PUBSUBSERVER_FACTORY);
PubSubServer server = factory.lookupPubSubServer(serverName);
```

Channels

Channels are named destinations to which clients subscribe to and publish messages to. A configuration file allows the users to define channels, mapping and security. In accordance with an embodiment, all channel management is done at a per web application level from the pub/sub server 'context'. The application designer decides whether or not clients can create and destroy channels. In accordance with an embodiment, channel creation or destroy operations can be constrained if required so that only some users (or a group of users) can perform these operations. Any attempt to do these operations by an unauthorized client will generate an error message.

```
Channel channel = pubsubServer.findOrCreateChannel (client, "/foo");
channel.subscribe(client);
...
channel.publish(client, message);
```

When a channel is deleted, all of the clients subscribed to that channel and sub-channels of that channel are automatically unsubscribed. Unsubscribed clients will receive a disconnect response message from the server when this happens, so that clients can try to reconnect and resubscribe to the interested channels.

Hierarchical Namespaces

In accordance with an embodiment, the channel namespace is hierarchical. A set of channels can be specified for subscriptions by a channel gobbling pattern, with wildcards such as '*' and '**'. The client will be automatically registered with any channels that are created after the client subscribed with a wildcard pattern.

JavaScript Library

In accordance with an embodiment, to allow Web 2.0 and Ajax clients to communicate with the event server, the clients need to have a JavaScript library which supports, e.g. the Bayeux protocol in JavaScript. An example of this is the Dojo toolkit. The client side Bayeux JavaScript framework is interchangeable, so that in alternate implementations users can choose the client side library of their choice.

Server-Side API

In accordance with an embodiment, the server side code can lookup channels from the pub/sub server, and subscribe and/or publish messages to the channels. The same API is used by the pub/sub server in response to client's messages. The 'publish' method is asynchronous and is configured to return immediately.

Authenticating and Authorizing Clients

In accordance with an embodiment, a protocol such as the Bayeux protocol or another channel-based protocol defines auth-tokens which are piggy backed on each message. However, the Bayeux protocol does not define what authentication schemes must be supported. In accordance with an embodiment, the system supports a variety of authentication schemes available in the servlet container, such as BASIC, FORM, CLIENT-CERT. If the request is accompanied by a Session cookie, and if the user is authenticated in the Session, then the same user is assumed to be authenticated. Safeguards such as auth-cookie are still relevant in the pub/sub server. To prevent a user agent from assuming different client identities, the server can send a cookie to the client. The cookie can be either a JSESSIONID or BAYEUX_HTTP_ID.

Controller Servlet

In accordance with an embodiment, the controller servlet is configured in the web.xml descriptor with a url-pattern. The controller servlet is the entry point for all messages from Bayeux clients. The controller servlet can be a FutureResponseServlet, since messages need to be handled asynchronously. This servlet translates all client messages to Bayeux messages, which the pub/sub server then understands. The controller servlet can be registered in web.xml as follows:

```
<servlet>
    <servlet-name> PubSubServlet </servlet-name>
    <servlet-class> com.appserver.httppubsub.ControllerServlet
    </servlet-class>
</servlet>
<servlet-mapping>
    <servlet-name> PubSubServlet </servlet-name>
    <url-pattern> /cometd/* </url-pattern>
</servlet-mapping>
```

The controller servlet initialization code is responsible for initializing the pub/sub server. Once the servlet is destroyed, the pub/sub server is also shut down.

Pub/Sub Handler

In accordance with an embodiment, the pub/sub server provides an API for handling messages so that users can write their own message handlers. The pub/sub server can provide the ability to configure the message handler in the configuration file. In accordance with an embodiment, the pub/sub server provides the following two message handlers:

A default in-memory pub/sub handler (which is not durable, not transactional and not clustered). This handler will handle the incoming message and only notify subscribers of delivered messages.

A JMS pub/sub handler which talks to a JMS provider (either external or in process) and delegates message handling to the JMS provider. The provider details are configurable in the pub/sub server's configuration file.

APPENDICES

This application includes a compact disc computer program listing appendix, which includes the files Appendix A.txt, Appendix B.txt, and Appendix C.txt, which compact disc computer program listing appendix is herein incorporated by reference. Appendix A illustrates an example of the Pub/Sub Interface Requirements in accordance with an embodiment. Appendix B illustrates an example of the External Java Programming Interface in accordance with an embodiment. Appendix C illustrates an example of a Configuration File in accordance with an embodiment.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The present invention may be conveniently implemented using a conventional general purpose or a specialized digital computer or microprocessor programmed according to the teachings of the present disclosure, as will be apparent to those skilled in the computer art. Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above. Included in the programming (software) of the general/specialized computer or microprocessor are software modules for implementing the teachings of the present invention.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for providing a publish and subscribe server that includes a channels-based means to allow clients to send and receive asynchronous messages, comprising:
    an application server;
    a publish and subscribe server that executes on the application server, and that
        provides channels that enable clients to use a hypertext transfer protocol to request subscriptions to one or more message producers at a message service distinct from the publish and subscribe server, and
        enables the one or more message producers at the message service to communicate messages to the publish and subscribe server;
    an index that associates a channel-based hierarchy of the channels used for the subscriptions requested by the clients, with a message-based hierarchy of message destinations at the message service, and enables messages that are produced by the message producers to be published to the clients using the channels, including wherein
        each client is associated with a client identifier,
        when the client requests a subscription, the client specifies a channel pattern to be associated with that subscription, and
        the system uses the channel pattern specified by the client to build or update a subscriber index that associates subscribed channels with the client; and
    wherein messages that are subsequently published by the message service to a particular message destination are targeted to one or more subscribed clients by including one or more channel patterns in those messages, and are delivered by the publish and subscribe server as hypertext transfer protocol responses to those one or more subscribed clients.

2. The system of claim 1, further comprising a configuration file that is used by the system to configure the channels, and to associate a selection of the channels with selected message producers.

3. The system of claim 1, wherein the message service is a Java Message Service (JMS) server, and wherein the index is used to maintain a channel to a JMS index, wherein as messages or events are generated by JMS message producers, the JMS server first communicates the messages or events to the publish and subscribe server, which then provides the messages or events to any subscribed clients on corresponding channels.

4. The system of claim 1, wherein each of the clients includes a browser application that can be used by the client to request subscriptions to a selection of channels at the server, and then use the hypertext transfer protocol to request and receive notifications from the publish and subscribe server as messages or events are generated.

5. The system of claim 1, wherein the channel-based protocol is a Bayeux protocol.

6. A method for providing a publish and subscribe server that includes a channels-based means to allow clients to send and receive asynchronous messages, comprising the steps of:
    providing an application server;
    providing a publish and subscribe server that executes on the application server, and that provides channels that enable clients to use a hypertext transfer protocol to request subscriptions to one or more message producers at a message service distinct from the publish and subscribe server, and that enables the one or more message producers at the message service to communicate messages to the publish and subscribe server; and
    providing an index that associates a channel-based hierarchy of the channels used for the subscriptions requested by the clients, with a message-based hierarchy of message destinations at the message service, and enables messages that are produced by the message producers to be published to the clients using the channels, including wherein
        each client is associated with a client identifier,
        when the client requests a subscription, the client specifies a channel pattern to be associated with that subscription, and the system uses the channel pattern specified by the client to build or update a subscriber index that associates subscribed channels with the client; and wherein messages that are subsequently published by the message service to a particular message destination are targeted to one or more subscribed clients by including one or more channel patterns in those messages, and are delivered by the publish and subscribe server as hypertext transfer protocol responses to those one or more subscribed clients.

7. The method of claim 6, further comprising providing a configuration file that is used by the system to configure the channels, and to associate a selection of the channels with selected message producers.

8. The method of claim 6, further comprising providing a Java Message Service (JMS) server, and wherein the index is used to maintain a channel to a JMS index, wherein as messages or events are generated by JMS message producers, the JMS server first communicates the messages or events to the publish and subscribe server, which then provides the messages or events to any subscribed clients on corresponding channels.

9. The method of claim 6, wherein each of the clients includes a browser application that can be used by the client to request subscriptions to a selection of channels at the server, and then use the hypertext transfer protocol to request and receive notifications from the publish and subscribe server as messages or events are generated.

10. The method of claim 6, wherein the channel-based protocol is a Bayeux protocol.

11. A non-transitory computer readable medium, including instructions stored thereon, which when read and executed by a computer cause the computer to perform the steps comprising:

providing an application server;

providing a publish and subscribe server that executes on the application server, and that provides channels that enable clients to use a hypertext transfer protocol to request subscriptions to one or more message producers at a message service distinct from the publish and subscribe server, and that enables the one or more message producers at the message service to communicate messages to the publish and subscribe server; and providing an index that associates a channel-based hierarchy of the channels used for the subscriptions requested by the clients, with a message-based hierarchy of message destinations at the message service, and enables messages that are produced by the message producers to be published to the clients using the channels, including wherein each client is associated with a client identifier, when the client requests a subscription, the client specifies a channel pattern to be associated with that subscription, and the system uses the channel pattern specified by the client to build or update a subscriber index that associates subscribed channels with the client; and wherein messages that are subsequently published by the message service to a particular message destination are targeted to one or more subscribed clients by including one or more channel patterns in those messages, and are delivered by the publish and subscribe server as hypertext transfer protocol responses to those one or more subscribed clients.

12. The non-transitory computer readable medium of claim 11, further comprising providing a configuration file that is used by the system to configure the channels, and to associate a selection of the channels with selected message producers.

13. The non-transitory computer readable medium of claim 11, further comprising providing a Java Message Service (JMS) server, and wherein the index is used to maintain a channel to a JMS index, wherein as messages or events are generated by JMS message producers, the JMS server first communicates the messages or events to the publish and subscribe server, which then provides the messages or events to any subscribed clients on corresponding channels.

14. The non-transitory computer readable medium of claim 11, wherein each of the clients includes a browser application that can be used by the client to request subscriptions to a selection of channels at the server, and then use the hypertext transfer protocol to request and receive notifications from the publish and subscribe server as messages or events are generated.

15. The system of claim 1, further comprising:
a plurality of web applications, and
a publish and subscribe server and channel namespace per each web application, that allows channels with a same name to be configured for use with two or more different one of the web applications.

16. The system of claim 1, wherein a client can use a wildcard channel pattern to specify a set of channels to be associated with a subscription, and wherein the client is automatically registered with any channels created after the client subscribed, matching the wildcard channel pattern.

17. The system of claim 1, wherein when a channel is deleted, all of the clients that were subscribed to the deleted channel, or to subchannels of the deleted channel, are automatically unsubscribed.

18. The method of claim 6, further comprising:
providing a plurality of web applications, and
providing a publish and subscribe server and channel namespace per each web application, that allows channels with a same name to be configured for use with two or more different one of the web applications.

19. The method of claim 6, wherein a client can use a wildcard channel pattern to specify a set of channels to be associated with a subscription, and wherein the client is automatically registered with any channels created after the client subscribed, matching the wildcard channel pattern.

20. The method of claim 6, wherein when a channel is deleted, all of the clients that were subscribed to the deleted channel, or to subchannels of the deleted channel, are automatically unsubscribed.

* * * * *

UNITED STATES PATENT AND TRADEMARK OFFICE
CERTIFICATE OF CORRECTION

| | |
|---|---|
| PATENT NO. | : 8,849,946 B2 |
| APPLICATION NO. | : 12/329396 |
| DATED | : September 30, 2014 |
| INVENTOR(S) | : Pallamreddy et al. |

It is certified that error appears in the above-identified patent and that said Letters Patent is hereby corrected as shown below:

Title Page, item (56),

On page 2, column 1, under Other Publications, line 15, delete "Aparche" and insert -- Apache --, therefor.

On page 2, column 2, under Other Publications, line 4, delete "Softward," and insert -- Software, --, therefor.

On page 2, column 2, under Other Publications, line 21, delete "Developement," and insert -- Development, --, therefor.

Signed and Sealed this
Twenty-eighth Day of April, 2015

Michelle K. Lee
*Director of the United States Patent and Trademark Office*